United States Patent [19]
Chrisman et al.

[11] 3,846,528
[45] Nov. 5, 1974

[54] METHOD OF CONTINUOUS VULCANIZATION IN THE PRESENCE OF HELIUM OR HYDROGEN

[75] Inventors: Willis L. Chrisman, Fairmont, Ind.; John D. Stauffer, De Kalb, Ill.; Edwin H. Arnaudin, Jr., Eden, N.C.

[73] Assignee: The Anaconda Company, New York, N.Y.

[22] Filed: Feb. 9, 1972

[21] Appl. No.: 224,876

Related U.S. Application Data

[63] Continuation-in-part of Ser. No. 842,418, May 9, 1969, Pat. No. 3,645,656.

[52] U.S. Cl............... 264/85, 264/174, 264/347
[51] Int. Cl. ...... B29h 5/28, B29h 7/16, D01d 11/06
[58] Field of Search ............ 264/347, 236, 85, 174; 425/72

[56] References Cited
UNITED STATES PATENTS

| | | | |
|---|---|---|---|
| 2,449,390 | 9/1948 | Kirby | 264/347 |
| 3,446,883 | 5/1969 | Garner | 264/174 |

FOREIGN PATENTS OR APPLICATIONS

| | | | |
|---|---|---|---|
| 36–8189 | 5/1958 | Japan | 264/347 |
| 814,320 | 6/1959 | Great Britain | 264/85 |

*Primary Examiner*—Robert F. White
*Assistant Examiner*—James B. Lowe
*Attorney, Agent, or Firm*—Pennie & Edmonds

[57] ABSTRACT

Method and apparatus are disclosed for continuously vulcanizing a polymeric strand such as a covering on an electrical conductor by passing the strand through a vulcanizing chamber containing helium or hydrogen under pressure and transmitting vulcanizing heat to the strand by conduction through such gas.

4 Claims, 7 Drawing Figures

3,846,528

METHOD OF CONTINUOUS VULCANIZATION IN THE PRESENCE OF HELIUM OR HYDROGEN

RELATED APPLICATION

This application is a continuation in part of a copending prior application Ser. No. 842,418, filed May 9, 1969, now U.S. Pat. No. 3,645,656.

FIELD OF THE INVENTION

This invention relates to the manufacture of polymeric strands, and, more particularly, to the manufacture of electric wires and cables having a central conducting strand of copper surrounded by one or more insulating and protective layers.

BACKGROUND OF THE INVENTION

It is known to produce electric wire and cables by extruding upon a metallic conductor an electrostatic shielding followed by a layer of uncured polymeric insulation. The electrostatic shielding, when used, is made of a semi-conducting material and forms a smooth surface which, if the conductor is used to carry high voltage will obviate corona discharge. Another function of the semi-conducting electrostatic shield is to provide a smooth conducting surface inside the insulation layer to maintain the inner surface of the insulation at constant potential. These two functions minimize the risk of electrical breakdown of the insulation layer, which is of a polymeric material having high dielectric strength.

As a final step, a jacket of polyvinyl chloride composition may be extruded about the insulated cable, the jacket providing moistureproofing and mechanical protection. Intermediate the jacket and insulation layers it is known to provide ground wires, with or without a layer of semi-conducting polymeric material, which maintain the exterior of the insulation layer and inner surface of the jacket at a common potential. As a consequence of the semiconductive shielding and ground wire system, electrical stress across the insulation will be uniform and the possibility of the failure of the insulation due to electrical causes is minimized.

It has been proposed heretofor to combine the extrusion and vulcanizing steps into a single continuous operation. For example, it has long been the practice to extrude unvulcanized rubber about a conductor and to pass the resulting covered conductor into a vulcanizer filled with hot steam with pressure to vulcanize the rubber. It has also been proposed to pass a conductor covered with an uncurred polymeric composition directly from an extruder into a curing chamber in which a noncondensible gas atmosphere such as nitrogen or carbon dioxide is maintained and to heat the polymeric material to the curing temperature in such atmosphere. See, for example, Migauchi et al., U.S. Pat. No. 3,513,228. Moore et al. U.S. Pat. No. 3,504,398 is illustrative of other proposals to pass a wire with freshly extruded covering thereon directly into a cooling chamber which, at least adjacent the extruder, is filled with gas under pressure.

SUMMARY OF THE INVENTION

The present invention provides an improved apparatus and improved method for vulcanizing or curing a freshly extruded polymeric strand such as a layer of insulation surrounding a copper or other metallic conductor. Apparatus according to the invention advantageously comprises a tube forming a vulcanizing or curing chamber connected to and extending downstream from an extrusion head. A substantially unchanging body of helium or hydrogen fills such tube and surrounds the extruded polymeric strand passing therethrough from the extrusion head. Means are provided for maintaining said body of gas at superatmospheric pressure. A heating jacket surrounds the tube, and means are provided for continuously circulating a heating fluid through such jacket at essentially ambient pressure. Means external to the jacket heat the fluid to a temperature sufficient for rapid curing of the polymeric strand as it passes through the tube, such heat being conveyed to the strand by conduction through the body of gas.

The method of the invention in a broad aspect provides for vulcanizing or curing a freshly extruded polymeric strand by passing said strand through a zone wherein a body of helium or hydrogen is maintained under pressure, and transmitting to said strand by conduction through said body of gas heat sufficient to vulcanize or cure said strand.

A significant feature of the invention resides in passing the freshly extruded but unvulcanized or uncrosslinked polymeric material directly from the extruder into a chamber filled with helium or hydrogen (preferably the former) wherein such material is heated to a temperature sufficient to vulcanize or crosslink (cure) it. The helium or hydrogen is maintained under pressure to prevent formation of voids in the polymeric material during the curing operation. The use of helium or hydrogen as the gas maintained in the curing chamber is of particular importance for effecting a very rapid cure of the extruded material. These gases are unique in that they have an exceptionally high heat conductivity, and it has been found that when they are present in the curing chamber the polymeric material is brought to its curing temperature much faster than if a gas such as nitrogen is employed.

The heat is supplied by placing the curing chamber or zone in heat exchange relation with a surrounding heating element or jacket. It has been found that rapid heating of the polymeric material depends largely on the heat conductivity of the gas filling the curing chamber. The rate of heating is very much reduced if reliance is placed on heat transfer by radiation and convection by using a gas of relatively low heat conductivity. For example, by using helium or hydrogen in the curing chamber, the curing time for a layer of polymeric insulation as an electric conductor can be reduced in a typical case to one-half or one-third the time required when the same product is cured in the same chamber filled with nitrogen. Reduced curing time of course means that the rate of passage of the insulated wires or other strand through the chamber may be greatly increased, and that the output of finished product from a given apparatus is correspondingly increased.

Although the heat conductivity of hydrogen is somewhat greater than that of helium, and although hydrogen is much less expensive than helium, helium is the preferred gas for use in accordance with the invention because it may be employed without fire or explosion hazard and because it is basically inert. However, hydrogen may be used successfully in all cases where adequate precautions are taken to eliminate risks of fire and explosion, and where (as is usually the case) the hydrogen exerts no adverse chemical effect on the polymeric composition during the brief curing process.

DESCRIPTION OF A PREFERRED EMBODIMENT

Figure 1:
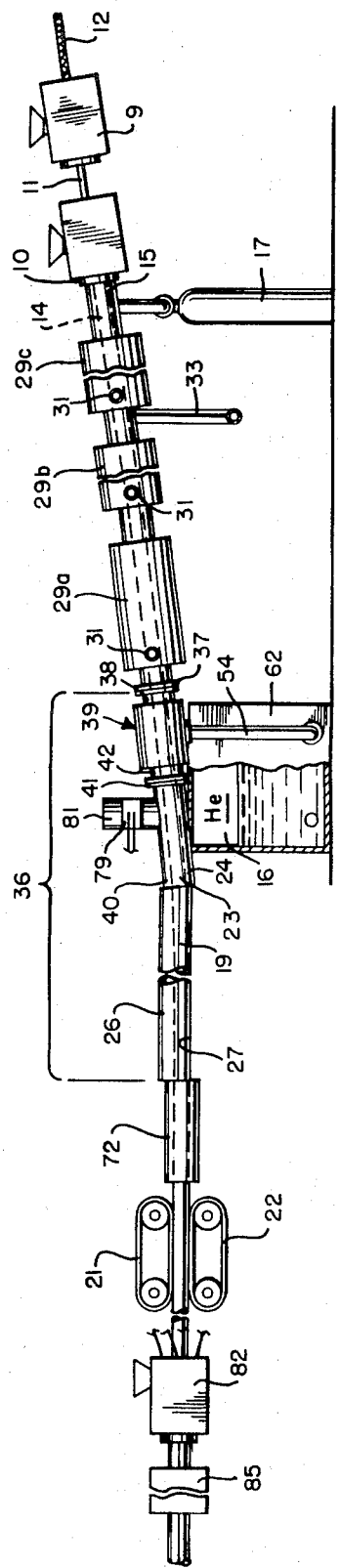
FIG. 1 is a diagramatic side view of an apparatus for continuously manufacturing cable according to the invention.
Figure 2:
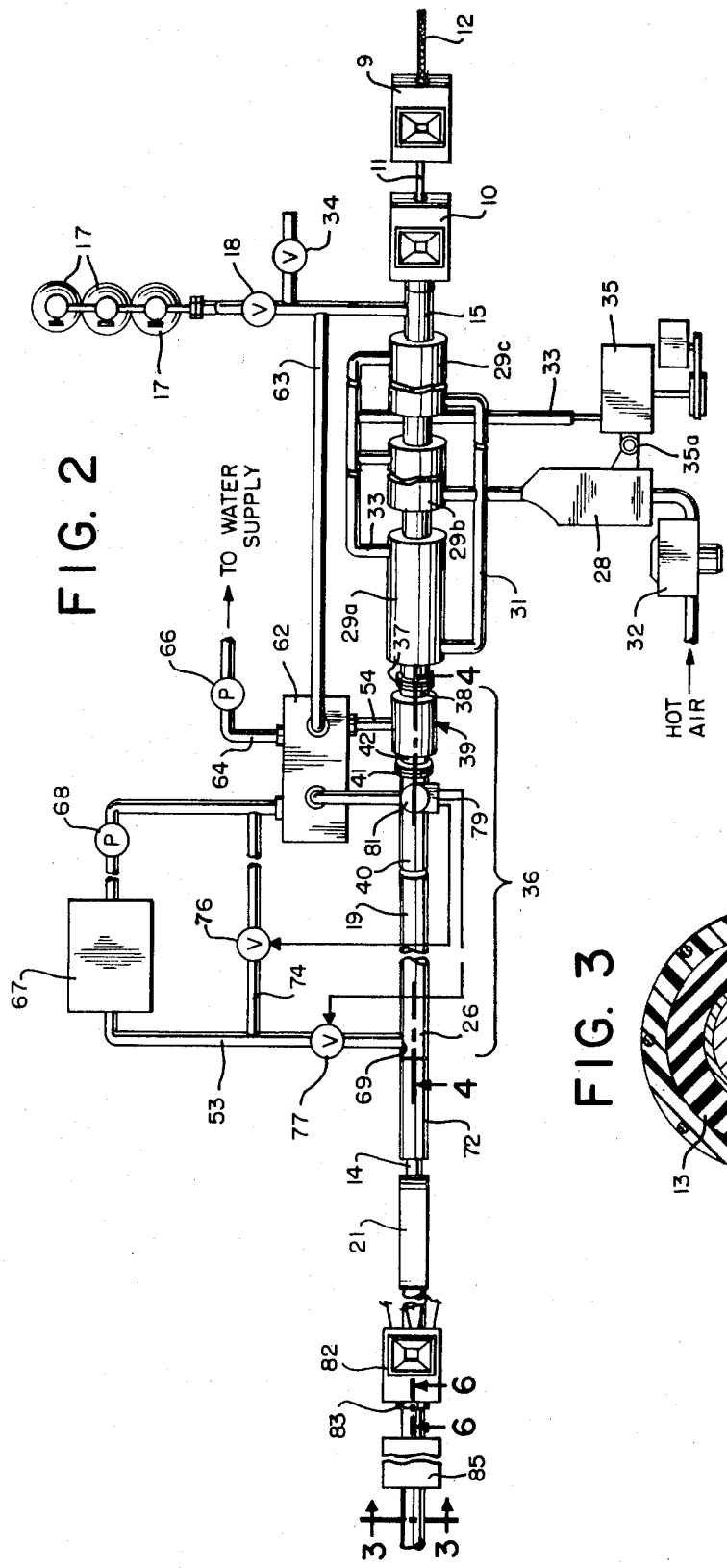
FIG. 2 is a diagramatic top view of the apparatus illustrating the heating and cooling systems of the invention.
Figure 3:
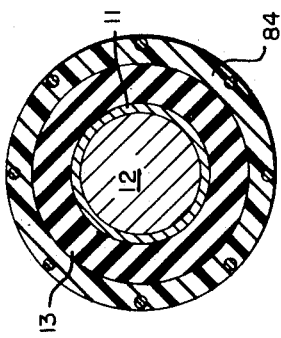
FIG. 3 is an enlarged cross-sectional detail of the finished cable.

Referring to FIGS. 1 and 2, the apparatus shown comprises the extrusion heads 9 and 10 of which a number of suitable types are known and which are associated with extrusion machines of a known type (not shown). A cable core 12 continuously enters the extruder 9 where it is covered with a thin layer 11 of semiconducting thermoplastic strand shielding that is capable of becoming thermosetting upon the addition of a suitable vulcanizing agent. A suitable composition for the strand shielding 11 comprises 31 parts of conducting carbon black and 69 parts of ethylene-propylene-(diene monomer) tripolymer, wherein the diene monomer comprises 1,4 hexadiene. The thickness of the layer 11 is about 5 mils or less and its purpose is essentially to coat the inside surface of the insulation wall with a semiconducting layer that will eliminate areas of electrical stress between the conductor and the insulation wall which might be sources of ionization. The particular advantage of the composition used for the shielding layer 11 is that the composition is itself free from vulcanizing agents and, consequently, temperatures of 430°F. and higher can be maintained at the extrusion die, the reduced viscosity of the extrudate at such high temperature permitting reduction in wall thickness without danger of pinholes.

The core 12 next enters extruder 10 when it is covered with a polymeric insulation layer 13 which is thermoplastic within the extruder head but can be irreversibly cured or set by the application of heat. The combined core 12, shielding layer 11 and insulation layer 13 form a cable 14. A number of suitable polymeric materials having high dielectric strength for forming the insulation layer 13 are known such as natural and synthetic rubbers and polyethylene containing appropriate known types of vulcanizing agents. During the extrusion of insulation layer 13, the vulcanizing agent will diffuse to an extent into the shielding layer 11.

The extruder 10 extrudes the polymeric covered cable directly into a curing tube or vulcanizing tube 15 which is filled with helium under a superatmospheric pressure supplied by a battery of helium cylinders 17. (Cylinders of hydrogen may be used instead, if desired). The pressure in vulcanizing tube 15 is controlled by a reducing valve 18 or other known means to a value such that a compression of cable 14 is effected to prevent the layer 13 from being porous or forming voids or bubbles. It has been found, for example, that a pressure of about 70 to 300 psi is satisfactory and higher pressures would have disadvantages of requiring the walls of tube 15 be made thicker and require the special construction of end seals. Once the helium has been introduced into tube 15, it remains substantially stagnant or unchanged since there is very little leakage.

The helium serves to transfer heat by conduction to the cable 14 in addition to compressing the extruded layers 11 and 13. For effective transfer of heat it is not necessary for the helium to circulate in the tube 15 although, of course, a certain amount of such circulation is unavoidably caused by the advance of the core 12. The helium is stagnant or unchanged in the sense that the same body of gas is maintained indefinitely in the tube 15 except as losses must be replaced, and leakage is kept to a minimum by means hereinafter to be explained. This stagnant property of the helium has the important advantage of reducing the heat transfer at the ends of the tube 15 where relatively cool pockets of the gas can accumulate. It is also important because it helps hold cost of the relatively expensive helium to a low value. Steam-filled tubes cannot function in this manner since steam will condense on any cool surface and fresh steam vapor must be immediately supplied to replenish the condensate.

The tube 15 is seen in FIG. 1 to have the form of a catenary with its highest point at the extruder head 11 and its lowest point at a section 19. The catenary is chosen to match the curvature of the cable 14 as it depends from extruder 10. Consequently cable 14 and its insulation layer 13 will not touch the walls of the tube 15. A constant curvature is maintained by placing the cable 14 under suitable tension by means of a capstan 21. The core 12 is paid into extruder heads 9 and 10 at constant speed by another capstan, not shown. With the cable 14 so maintained in catenary curvature it is a feature of the present invention that the floor 23 of the tube 15 and any continuing tubes or chambers are always separated from the surface of the cable by a gap 24. At the base of the catenary, however, tube extension 26 has a floor 27 which is stepped up from the floor 23 at a distance equal to the gap 24. At this point, however, the insulation 13 will have cooled so that the cable can ride upon the floor 27, which thus serves as the lower terminus of the cable catenary.

The helium gas in the tube 15 is heated by means of hot air and combustion gases from a furnace 28. The heated gases are circulated through sections 29a, 29b, 29c collectively comprising a jacket surrounding the tube 15. The hot air enters the jacket through a manifold 31 driven by a blower 32 and is returned to the furnace 28 through a manifold 33. A temperature sensing control 35 operating the vent 35a can be adjusted to control the temperature of the recirculation gases.

Heavy walls of heat insulation (not shown) cover the outside surfaces of the jackets and manifolds in the usual manner. Very high temperatures, limited only by the heat tolerances of the structural materials of the tube can thus be applied to the apparatus without increasing the internal pressure of the helium which can be released by an appropriate check valve 34 if this is desired. Helium vented through this valve may be collected and compressed for use by conventional apparatus, not shown.

There is an advantage, particularly at high temperatures, to use inert helium for transferring heat to the polymeric covering 13, apart from its high heat conductivity, since contact with air at high temperature would have an adverse oxidizing effect on the polymer. But it is cheaper to circulate a free gas such as air through the furnace 28 and manifolds 31, 33 which do not then have to be leak proofed beyond the requirements of any hot air system. Helium is also, of course, conserved by the provision, already discussed, that the supply 16 is stagnant.

As noted above, the use of helium or hydrogen as the gas filling the vulcanizing tube 15 is of importance because of the high heat conductivity of these gases. Heretofor it has generally been assumed that heat transfer to a polymeric strand being cured in a non-condensible gas atmosphere was largely by convection and radiation, and the gases heretofor proposed for use in such an operation have been the common inexpensive inert gases such as nitrogen and carbon dioxide. Experiments have shown, however, that by substituting helium for nitrogen in a vulcanizing operation of this sort, the time required for curing is greatly reduced. For example, a full core of a polyethylene layer 3/64 inch thick on a No. 12 AWG copper conductor is obtained by advancing such strand through a vulcanizing tube 15 about 42 feet long at a rate of about 60 feet per minute when the gas in such tube is nitrogen at about 275 psi and the temperature of the tube wall is maintained at about 725°F. by circulation of hot gases through the heating jackets 29a, b, c. When the nitrogen is replaced with helium, all the conditions being the same, a full cure of the polyethylene layer is obtained when the rate of strand advance is about 180 feet per minute. Thus the use of helium cuts the curing time to about one-third of the time required when nitrogen is used.

Hydrogen has a slightly better heat conductivity than helium, and its use likewise greatly increases the speed of cure. However, the use of hydrogen poses problems on account of its inflammability and the explosive hazard if air or oxygen becomes mixed with it. Also, hydrogen might react chemically with some components of a curable polymeric composition, with disadvantageous results. For these various reasons helium is the preferred gas with which to pressurize the vulcanizing tube 15, despite its high cost relation to hydrogen.

The apparatus comprises means for transition between the heated tube 15 and a cooling chamber 36 through which refrigerated water is circulated at high velocity. This transition means is shown most fully in FIG. 4 where the catenary tube 15 is seen to be connected by means of a flange 37 to a flanged cylinder 38 that is welded to an enlarged sump enclosure 39. Similarly a pipe 40 is connected by means of a flange 41 to a flanged cylinder 42 that is welded to the opposite (downstream) end of the enclosure 39.

Figure 5:
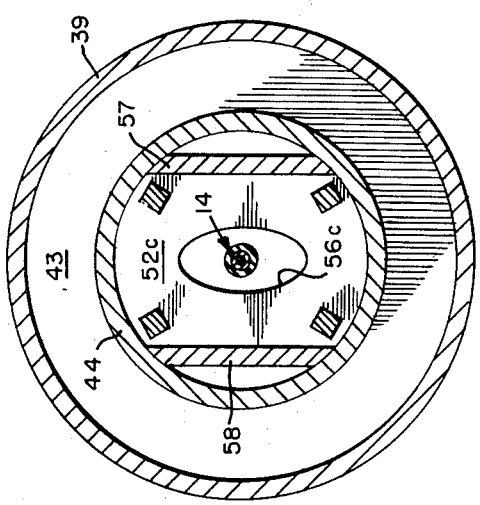
FIG. 5 is a cross-sectional view taken along the lines 5—5 of FIG. 4.

Projecting inwardly from an upstream wall 43 of the enclosure 39 there is welded a cylinder 44 to which is fastened a retaining plate 46 and projecting inwardly from a downstream wall 47 is welded a cylinder 48 with a retaining plate 49. The retaining plates 46 and 49 combined with the walls 43, 47 serve to confine baffle plates 51a, 51b, 51c and 52a, 52b, 52c and 52d within the respective cylinders 48 and 44. The plates 51a-c and 52a-d are seen to have vertical sides 57, 58 (FIG. 5) so that they can be restrained from rotation by guide plates 59a and 59b, and 61a and an opposing guide plate that does not shown in the drawing. The cylinder 48, pipe 40, tube section 26 and sump enclosure 39 together comprise the aforementioned cooling chamber 36 through which refrigerated water is circulated.

The water enters the chamber 36 downstream (from the point of view of the cable movement) through a pipe 53 (FIG. 2) and leaves through a pipe 54 that opens into the bottom of the enclosure 39 from a point 56 between the innermost baffle plates 51c and 52a. The pipe 54 and enclosure 39 constitute a sump for collecting cooling water before it can enter the tube 15. Entry of water into the tube 15 is further prevented by the baffle plates 52a-d which have centered elliptical openings 56a-d sufficiently oversized to assure that the insulation layer 13 will not contact the sides of the openings but small enough substantially to keep water from splashing upstream into the tube 15. It will be understood, in this regard, that the shape of the catenary curve formed by the cable is maintained under close control in a known manner by varying the tension being applied by the capstan 21 in response to a position sensing device within the tube 15. This device is not shown in the drawing but several types are commercially available. The openings 56a-d are elongated vertically to accommodate the riser of the catenary without permitting contact of the baffle plate with the cable as it advances through our apparatus. The pipe 54 is large enough to provide exhaust gravity flow for all the water from chamber 39 that is needed to cool the largest cable that will be processed in the apparatus.

Figure 4:
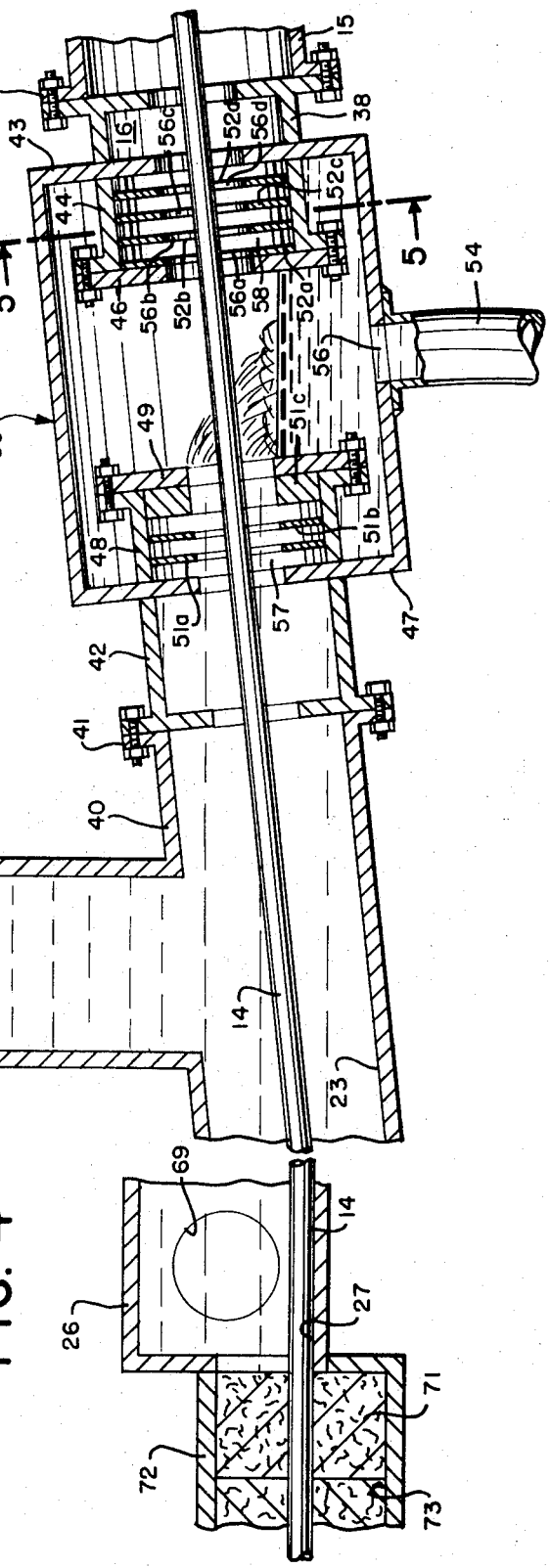
FIG. 4 is an enlarged sectional view taken along the lines of 4—4 of FIG. 2.

Pipe 54 empties into a storage tank 62 which is maintained at the system pressure by a connection 63 to the helium line. Storage tank 62 provides a means whereby any helium gas which becomes mixed with water in the sump can separate out into the upper part of the tank and return to chamber 39. The level of water in the storage tank 62 is maintained by a pump 66 having a water source (not shown) whose operation is controlled by known means (not shown) sensing the water level in the tank 62. Water from the tank 62 is circulated at a high speed by another pump 68 through a refrigerator 67 into the tube section 26 just upstream of a conventional series of pressure seals 71 (FIG. 4). The water fills tube section 26 and it is in this section that cooling of the advancing cable is achieved.

Conventional seals can be used at the downstream end of the tube 26 since the insulation layer 13 is cool and hard as a result of the extraction of heat by the cooling water. A length of pipe 72, however, which contains the seals 71 is dropped so that its floor 73 is lower than the floor 27, thus the cable which has been riding on the floor 27 can be centered in the seals 71.

Pump 68 is operated continuously to circulate cooling water through tube section, sump or chamber 39 and therefrom to storage tank 62. The by-pass pipe 74 an automatic valve 76 are provided to allow excess water to circulate when it is not needed for cooling the chamber 36. Automatic control of the valve 76 and the valve 77 in a pipe 53 connected at its junction 69 with tube section 26 is accomplished as follows: A riser 81 extends vertically from pipe 40 which is immediately downstream of the sump 39. The top of the riser 81 is connected by suitable piping to the top of the tank 62 so that there is high pressure helium therein above the water level at the pressure of the helium system. A suitable level sensing control 79 is located in the riser 81 for sensing the water/gas level therein. The control 79 is adapted to activate valves 76, 77 and by this means regulate the flow of coolant into the tube section 26 which will maintain a predetermined height of water in the riser 81. Except for the upstream end of the enclosure 39, the chamber 36 is entirely full of refrigerated, rapidly moving water which enters through the pipe 53 and leaves through the pipe 54. The pressure of the water in tube section 28 and sump enclosure 39 is therefore higher than the pressure of helium by a factor equal to the head of the riser 81. This excess pressure, in combination with the baffle plates 51a-c is sufficient to prevent helium from advancing downstream of the sump enclosure 39. The riser 81 will also accommodate surges of water pressure to an extent which may occur and thus cooperates with the baffle plates 52a-c to prevent the admission of water into the vulcanizing tube 15. It is important to note that prior systems using steam for vulcanizing having a steam cooling water interface actually provided a vulcanizing tube of indeterminate length because of constant surges of water into the steam filled tube. This defect is eliminated by the present invention.

Except for slight amounts of helium which have dissolved in the water and thereafter escapes past the seals 71 there is essentially no helium loss, with the result that the body of helium remains stagnant or unchanging and the cost of this gas is small except for refilling after shutdown. The helium provides means for maintaining the covering 13 under pressure during curing and cooling and of transferring heat to the covering from the circulating hot air. Transfer of heat from the helium to the cooling water is minimized by the fact that water contact with helium is essentially restricted to the sump enclosure 39 since the water is withdrawn so rapidly by gravity flow from the sump that it cannot enter upstream past the baffle-plates 52a-d. The helium in the sump enclosure 39 is rapidly cooled, and since it is stagnant and communicates with the hot helium upstream only through the rather small openings 56a-d, it serves as heat insulation against heat transfer from the water to the hotter helium body, despite its good (for a gas) heat conductivity. The difference between the disclosed arrangement and a steam vulcanizing system of the usual type is of great importance to obtain the maximum cooling effect from the water, for if the helium were replaced by steam, the heat of vaporization and sensitive heat of water condensed from the steam would be added to the cooling load. As a result it has been found that the length of the cooling chamber 36 required by our apparatus is one-third less than that required in conventional steam vulcanizers.

Figure 6:
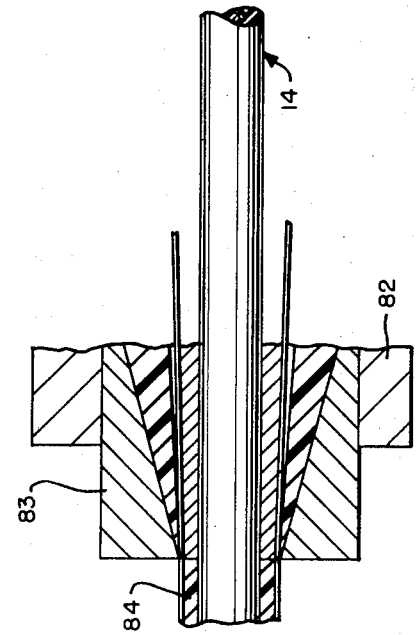
FIG. 6 is an enlarged section taken along the lines 6—6 of FIG. 2.

After emerging from seals 71, the now insulated cable is first dried (for example, by a sponge type drier, not shown, such as described in U.S. Pat. No. 3,386,120) and is then fed directly into a jacket extruder 82 to complete the process of manufacturing. The rate of extrusion in the extruder 82 will be governed largely by the rate at which vulcanization and cooling of the cable takes place previously. With reference to FIG. 6, the extruder head 83 is shown depositing in combination, an extruded semiconducting polymeric coating 84 in which are embedded axially arranged ground or drain wires. By this method of manufacture, the drain wires are applied during the extrusion operation at extrusion speeds and the wires are securely embedded in the semiconducting jacket. Upon leaving the head 83, the cable passes through an apparatus 85 which may be solely a cooling apparatus, or if vulcanizing and cooling is required, the apparatus 85 may be similar in all respects to that hereinabove described.

In an alternate form of the present invention (see FIG. 7), the jacket extrusion step is accomplished immediately following extrusion of the insulation layer. Accordingly, there are provided extrusion heads 9', 10' and 83', the latter being directly connected in sealing engagement with the vulcanizing tube 15'. Although the extruder heads have been shown separately, it will be understood that a single multiple extruder may be used. Tube 15' is similar to tube 15 previously described, and will be connected to a cooling chamber similar to chamber 36.

In either of the two forms of jacket extrusion immediately described above, there are particular advantages achieved by having the jacket step performed as a continuous part of the overall cable manufacturing process. For example, in the primary form described in FIGS. 1-6 wherein the jacket is extruded subsequent to vulcanization and cooling of the insulation layer, the continuous process provides superior joining of the jacket to the insulation. One reason for this is that the insulation is entirely free from contamination, distortion, damage or other defects which might very well occur through handling and storage of the insulated cable prior to a delayed final jacket extrusion step. In a process where the jacket requires vulcanization, the bonding effect between jacket and insulation can be further increased, if desired, by undercuring the insulation and curing it finally during vulcanization of the jacket.

A further advantage not so readily apparent is produced by subjecting the metal core for a prolonged period of time to the high heat of the vulcanizing tube 15. During the course of vulcanization of the insulation layer, the metal core becomes heated to a very high temperature and even after the cable has proceeded through the cooling chamber 36, the core remains at an elevated temperature (for example, about 160°F.). This sensitive, retained heat of the core is useful during the jacket extrusion process which immediately follows and will aid in achieving a good bond between the jacket and insulation layers. It is important that this bond be free from voids which might produce corona discharge effects.

Figure 7:
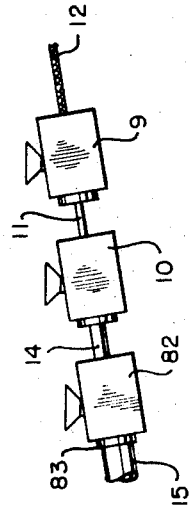
FIG. 7 is a diagramatic side view of an alternative arrangement of the extruding devices shown in FIGS. 1 and 2.

The valuable advantages of superior bonding and protection of the insulation layer from defects just referred to with respect to extruding the jacket subsequent to vulcanization and cooling of the insulation layer also apply where the jacekt is extruded about the insulation layer prior to the vulcanization step as illustrated in FIG. 7. Of course, in this case the jacket is of a type which requires vulcanization and naturally, due to the combined thicknesses of the respective layers, vulcanization will proceed more slowly.

It will be understood that the foregoing description has related to a particular embodiment or embodiments of the invention and therefore is merely representative. In order to understand fully the spirit and

We claim:

1. A method of continuously vulcanizing a freshly extruded polymeric strand which comprises passing said strand through a zone wherein a gas selected from the group consisting of helium and hydrogen is disposed, simultaneously maintaining said gas under several atmospheres pressure and in relatively unchanging and stagnant state within said zone about said strand, transmitting to said strand by conduction through said gas heat sufficient to vulcanize said strand, and cooling said strand in a cooling area, said gas also serving as heat insulation against heat transfer between said cooling area to said zone.

2. A method according to claim 1 in which said gas is heated by indirect surrounding contact with a hot fluid.

3. A method of continuously manufacturing an electrical cable comprising feeding an electrically conducting core into an extruder and extruding thereon a polymeric layer of insulation, passing said cable through a first zone wherein said cable is immersed in a gas selected from the group consisting of helium and hydrogen under pressure and in relatively unchanging and stagnant state within said first zone, transmitting heat to cure said insulation layer to said cable by conduction through said gas, passing said cable through a second zone wherein said cable is cooled, said gas also serving as heat insulation against heat transfer between said first and second zones, and maintaining said cable in a catenary curve throughout heating and cooling and free from contact with adjacent surfaces until the cured insulation has hardened.

4. A method of rapidly and continuously forming a vulcanized polymeric covering on an electric conductor which comprises continuously extruding an unvulcanized polymeric conductor about the conductor, continuously passing the resulting covered conductor through a vulcanizing zone wherein a relatively unchanging body of gas selected from the group consisting of helium and hydrogen is maintained under superatmospheric pressure and in relatively unchanging and stagnant state within said zone, heating said covering to vulcanizing temperature by conduction through said gas, and continuously supplying heat to said body of gas by maintaining said body in heat exchange solution with a surrounding flowing stream of a hot fluid, and cooling said covered conductor in a cooling area, said gas also serving as heat insulation against heat transfer between said cooling area to said zone.

* * * * *